W. H. FAUBER.
SCAVENGING SYSTEM FOR INTERNAL COMBUSTION ENGINES.
APPLICATION FILED NOV. 7, 1916. RENEWED OCT. 25, 1921.
1,417,310.
Patented May 23, 1922.
3 SHEETS—SHEET 1.
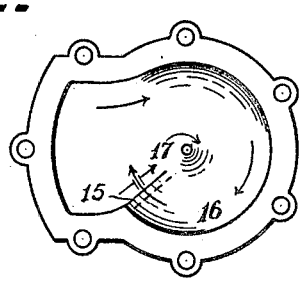
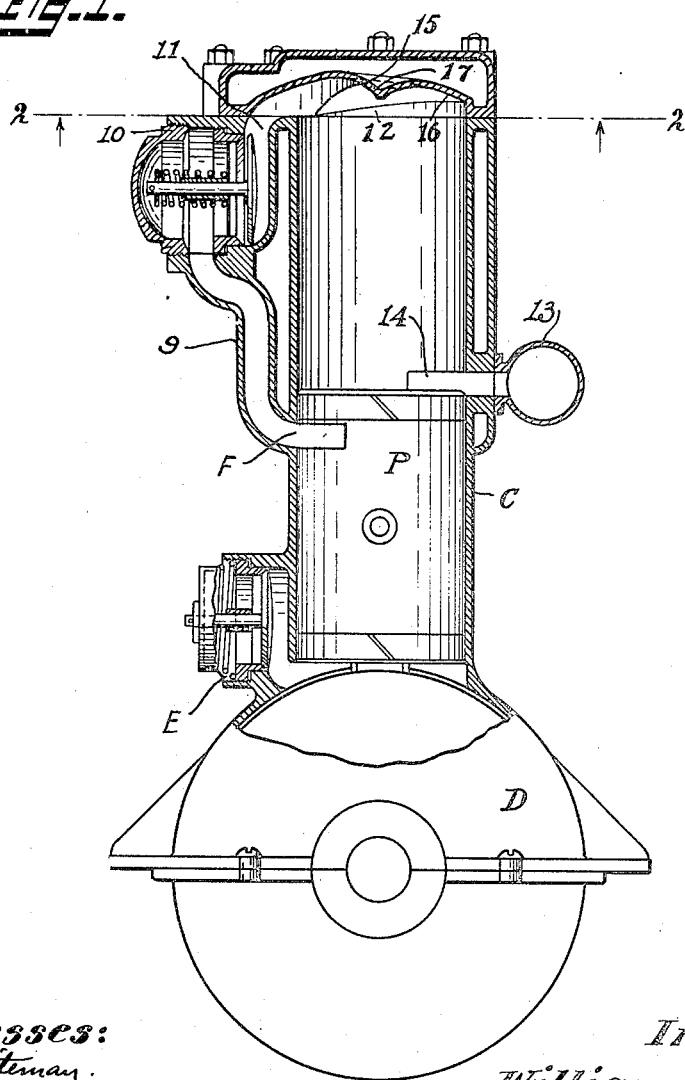

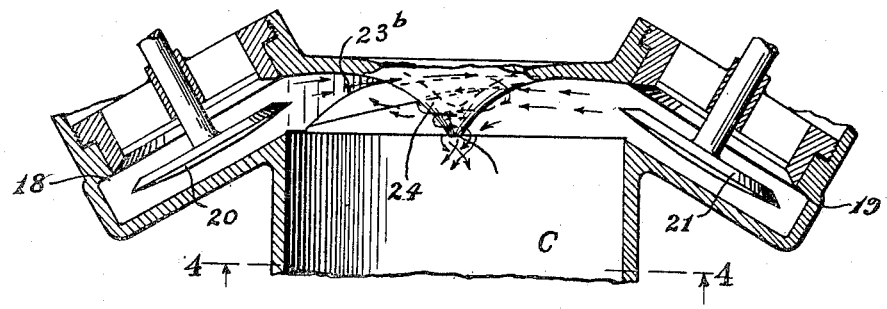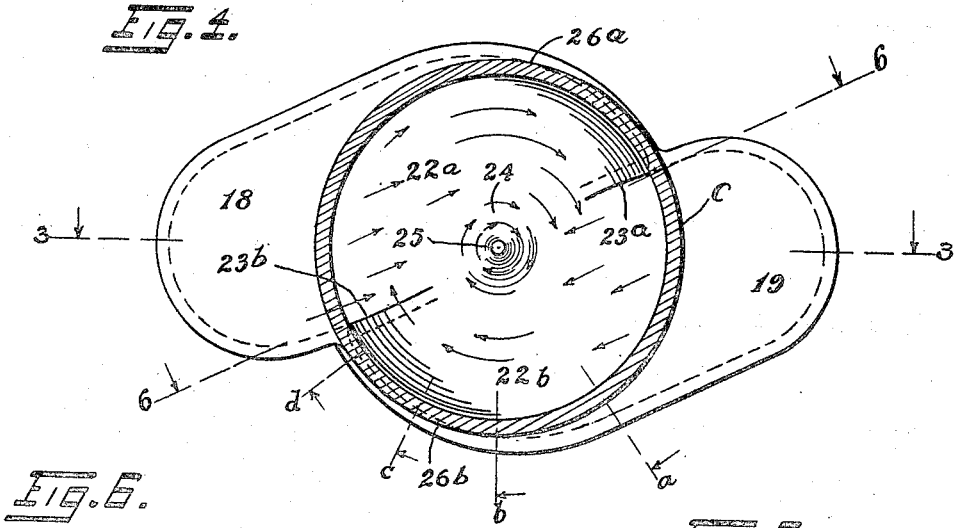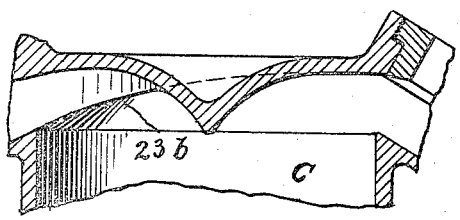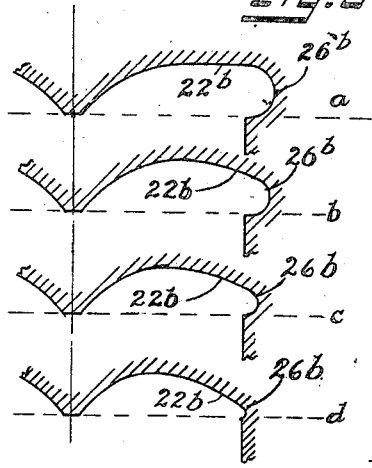

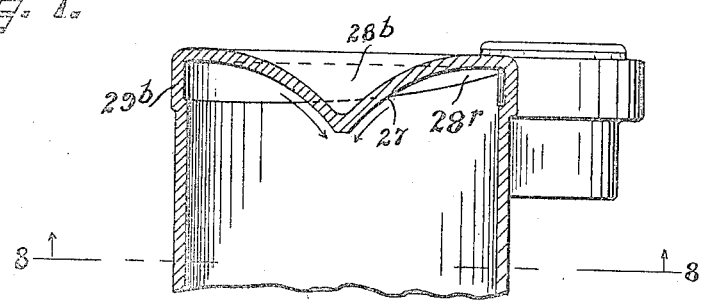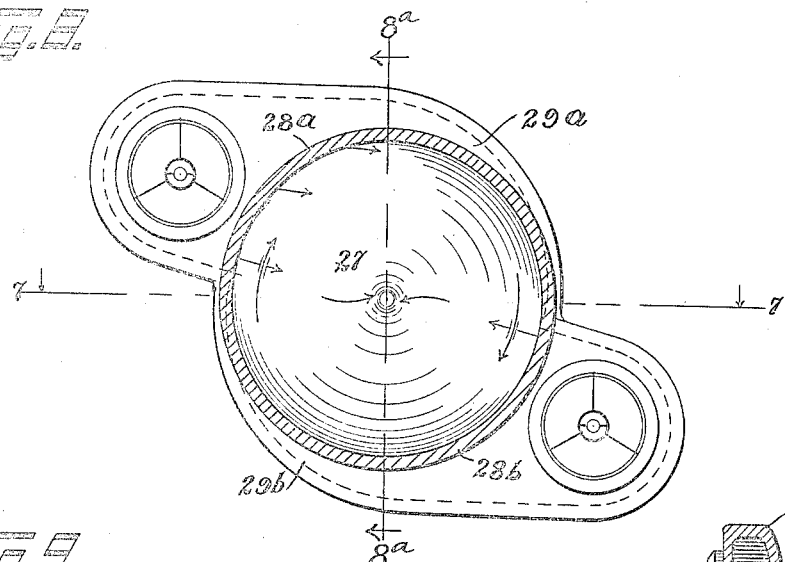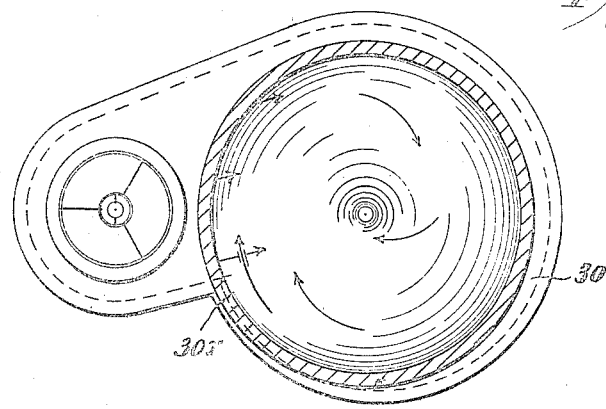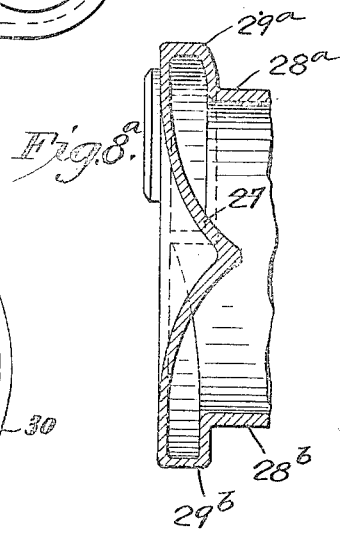

UNITED STATES PATENT OFFICE.

WILLIAM H. FAUBER, OF BROOKLYN, NEW YORK.

SCAVENGING SYSTEM FOR INTERNAL-COMBUSTION ENGINES.

1,417,310.   Specification of Letters Patent.   Patented May 23, 1922.

Application filed November 7, 1916, Serial No. 129,932. Renewed October 25, 1921. Serial No. 510,289.

*To all whom it may concern:*

Be it known that I, WILLIAM H. FAUBER, a citizen of the United States, residing in Brooklyn, in the county of Kings and State of New York, have invented certain new and useful Improvements in Scavenging System for Internal-Combustion Engines, of which the following is a specification.

My invention relates more particularly to two-cycle, internal combustion motors, but may be applicable to any engine or purpose where it is desirable to produce a homogeneous, fluid current, or a segregation of the gases, as in a four-cycle engine.

In motors for automobiles, aeroplanes and where the greatest reliability, efficiency and flexibility are desired, the four-cycle engine is most universally used, notwithstanding that this principle has several inherent shortcomings which the two-cycle engine would largely obviate if an equally efficient scavenging system were provided for two-cycle motors.

In carrying out the present invention, advantage is taken of the fact that a moving body of fluid will maintain its general consistent integrity and that only surface portions of such moving body will mingle with the surrounding fluid; and that the direction of a current of fluid may be deflected and controlled by impact and adhesion with a deflecting surface.

The idea of controlling the gas in an engine cylinder by a tangentially injected current of gas striking against the cylinder wall is old, but the results thereby obtained do not accomplish the purposes of my invention for the reason that there is a tendency of the entering gas to follow the walls of the cylinder and form a hollow column which envelopes and mixes with the burned gas and also permits a portion of the fresh gas to escape with the exhaust in the case of a two-cycle engine.

It is obvious that with a current of gas entering a cylinder tangentially, as aforesaid,—and the head of such current being directed in a circular path by striking against the concave walls of the cylinder, or combustion chamber, a portion of said current will also flash lengthwise of the cylinder bore, thus breaking up the head of the spiral column and resulting in a mixture of the fresh and burned gases; it is a further object of the present invention to minimize this action.

For the purpose of preventing the formation of the hollow column of gas referred to, and, in order to produce a homogeneous core filling the hollow column and which will act substantially like a scavenging piston, I provide the end of the cylinder adjacent to the intake port with a deflector, preferably in the form of a blunt cone concaved radially, the surfaces of said deflector registering with the gas intake passage.

These and other features, capabilities and advantages of specific embodiments of the present invention will appear from the subjoined detail description thereof illustrated in the accompanying drawings, in which—

Figure 1 is a fragmental sectional view illustrating one embodiment of the present invention, in which there is but one fuel inlet.

Fig. 2 is a detached inner view of the head of the cylinder illustrated in Fig. 1.

Fig. 3 is a fragmental sectional view of the end of the cylinder on the line 3—3 of Fig. 4, illustrating another embodiment of the present invention in which two inlets are provided.

Fig. 4 is a section on the line 4—4 of Fig. 3.

Fig. 5 illustrates diagrammatically a number of sections along the lines $a$, $b$, $c$ and $d$ of Fig. 4.

Fig. 6 is a section along the line 6—6 of Fig. 4.

Fig. 7 is a fragmental sectional view of the end of the cylinder on the line 7—7 of Fig. 8, illustrating another modification of the present invention in which the steps are omitted.

Fig. 8 is a section on line 8—8 of Fig. 7.

Fig. 8$^a$ is a section on line 8$^a$—8$^a$ of Fig. 8.

Fig. 9 is a modification of Figs. 7 and 8 showing a single intake port and the extension of the annular port channel around the combustion chamber.

In Figs. 1 and 2 there is illustrated a single cylinder, two-cycle engine of the base compression type, comprising a cylinder C, a crank case D, a hollow piston P operating in said cylinder C; the initial valve-controlled gas inlet E opening into the crank case D, from which the fuel travels through the hollow piston P to the opening F formed in the piston P and, at the proper registration of the piston P with the opening in the cylinder C, passes up through the conduit 9 to the intake valve, or intake means, 10, then through said valve into the intake passage 11, and into the combustion chamber 12; an exhaust port 14 provides for the expulsion of the burned gases which pass out the exhaust pipe 13.

The intake valve 10, as shown, is of the poppet type mounted in a cage and operated by the pressure of the gas released by the piston, but said intake valve may be controlled by mechanical movement in the usual manner, or, where it is desirable to market a simple, low-priced engine, this valve may be dispensed with entirely as it is obvious that the piston port F would control the admission of gas, and, in this case, the ignition could take place in the intake passage from the port to the cylinder, as has been suggested heretofore. The function of the poppet valve F may also be accomplished by a piston-controlled port in the lower part of the cylinder, as is frequently done.

In the embodiment illustrated in Figs. 1 and 2, only one gas intake or intake port is provided, the gas entering the combustion chamber being directed tangentially, due to the deflections caused by the walls of the passage and the vertical wall of the step 15. Said step is approximately the depth of the intake port at the cylinder bore and tapers toward the center of the combustion chamber, terminating preferably about mid-way between the bore of the cylinder and the axial center of the cylinder, it being understood that the axial center of the cylinder bore is here considered as coinciding with the center of the combustion chamber and also the center of the deflector, hereinafter described.

The top of the combustion chamber, adjacent to the outer circular wall, forms a spiral surface 16 terminating at the step 15, the other end of said spiral registering with one side of the intake port passage and, in this embodiment, being a continuation of the top surface of same.

As indicated by the arrows in Fig. 2, a portion of the gas entering the combustion chamber is deflected around the inner walls of the combustion chamber, and, coming to the step formation 15, passes under the current of incoming gas, thereby forming a spiral column of gas. The depth of said step is regulated by the dimension of the intake port opening, and preferably the spiral surface terminates at the step in a well-defined corner, so that the spiral current of gas will leave the step without distorting its direction; the offset surface of the step, as shown in Figs. 1 and 2, forms a continuation of one side of the intake port passage 11 and may be a vertical or an inclined step, as desired.

In order to prevent the tendency of the incoming gas to form a hollow column within the cylinder, a deflector 17 is provided, said deflector preferably having the general contour of a blunt cone, the surface of which blends into the spiral formation 16 except at the side next to the intake port and adjacent to the step where the surface of said deflector properly extends to the bore dimension of the cylinder and registers with the intake port, being, in effect, a continuation of the intake passage, as shown. In other words, the deflector 17 is the central continuation of the spiral surface 16. By preference the surface of the deflector 17 is concavo-convex, being concaved radially and convex circumferentially.

By the term concavo-convex as applied to the deflector 17, is meant that the surface of said deflector is concave in one direction, radially, and convex in another direction, circumferentially, by means of which the stream lines of the fluid currents have a general direction radially toward the apex of the deflector and at the same time circumferentially around the deflector. Since a fluid in motion can be controlled by a surface and has a tendency to follow the exterior of a cylindrical surface, it is obvious that a portion of the incoming gas will be deflected toward the point of the cone and that the gas, striking the deflector tangentially, will follow around the cone and produce a core of gas filling the hollow column, the whole comprising a spinning homogeneous piston of gas.

In Figs. 3 to 6 inclusive, there is illustrated the cylinder head of another embodiment, in which, instead of a single intake, a plurality of intakes are provided, two tangential intakes being shown. The embodiment comprises a cylinder C having two valve pockets 18 and 19, in which poppet valves 20 and 21 are placed for the purpose of controlling the admission of gas, it being understood that they may be operated mechanically or automatically, as desired, and that ordinarily both valves would operate in unison. By using a plurality of intakes, the incoming gas currents can be opposed in their action and the head of the column of each charge of gas will be more uniform and a greater quantity of gas can be handled, which is desirable in high speed engines working to the maximum. Whether there be two intakes, as shown in Fig. 4, or a greater number, it is understood that, by spacing said intakes evenly around the combustion chamber, the incoming currents will meet at the center of the deflector and be deflected centrally of the cylinder bore and that, by opposing the currents, the velocity energy will be better applied to creating the desired whirling motion.

In the embodiment here showing two inlets, the spiral-forming surfaces $22^a$ and $22^b$ are divided into two half circles by the steps $23^a$ and $23^b$. The deflector 24, as indicated, is preferably of cone formation, having concavo-convex surfaces blending into the spiral sections and also blending into or registering with the intake ports, said deflector thereby cooperating with said intake ports so that a portion of the incoming fluid current will be directed so as to form a whirling core. The point of the deflector cone 25 may be blunted to prevent overheating.

As shown in Fig. 3, the intakes from the valve pockets 18 and 19 may be arranged at an angle with reference to the combustion chamber, so that the incoming gas will be directed upward against the spiral-forming surfaces and the deflector and conform to the contour of said surfaces. The radial sides of the intake ports, registering with the steps $23^a$ and $23^b$ are shown in Fig. 4 as being slightly tangential to the center of the deflector and the central axis of the cylinder bore, so that the incoming gas current may be made to meet a trifle, or as much as desired, at the point of the deflector cone, and a greater volume of gas may thus be projected centrally into the core of whirling gas.

Referring to Figs. 4 and 5, annular channels $26^a$ and $26^b$ extend circumferentially around the combustion chamber, terminating at the radial side of the adjacent intake ports and being, by preference, gradually increased in the cylinder diameter dimension toward the intake ports with which they connect. In depth these channels may extend the depth of the intake ports or be the depth of the usual counterbore in the combustion chamber between the cylinder and the top of the combustion chamber. Said channels serve to direct the incoming gas currents around the cylinder in the spiral formation desired and also diminish the tendency of the gas to flare down the cylinder wall. The enlargement of the annular channels $26^a$ and $26^b$ toward the intake passage provides, in effect, annular intake ports extending around the combustion chamber and has the advantage of distributing the flow of incoming gas tangentially into the cylinder in a manner to cause the greatest acceleration of the fluid currents and thereby, control of the gases.

In Fig. 5 the sections $a$, $b$, $c$ and $d$, taken on the lines $a$, $b$, $c$ and $d$ of Fig. 4, illustrate diagrammatically the entire surface $22^b$. Fig. 6 illustrates the surface $22^b$ in cross-section, showing its highest and lowest points.

Figs. 7 and 8 illustrate a modification of my invention, the function of the steps and spiral surfaces being accomplished by so shaping the port openings into the cylinder as to feather the radial side of the incoming current of gas, thereby permitting the adjacent spiral current to overlap said incoming current without disturbing the natural flow of either at the point of overlapping.

The deflector 27 is provided as before, the surface of said deflector blending into and registering with the top of the intake ports $28^a$ and $28^b$; said port openings are decreased at the radial end $28^r$, Fig. 7, for the purpose of feathering the current of incoming gas. The other end of the port openings are enlarged and carried around the circumference of the combustion chamber forming the channels $29^a$ and $29^b$, Fig. 8, said annular channels serving to direct the flow of gas around the cylinder and prevent the flaring and distortion of the spiral current that would naturally follow the deflection of a current of high velocity.

By the term "feathering" the current of incoming gas as referred to, it is meant that the radial side of said incoming current is thinned out by the reduced opening of the port at this side, and, since the current of gas entering the cylinder would be deflected around the interior of the cylinder, it would thereby produce a spiral current, which would pass under and underlap the thin feathered edge of the current as it enters the cylinder from the port, whereas if the radial side of said port were not feathered but instead the port opening made rectangular in form, then the underlapping current on meeting with the thick edge of the incoming current would set up a turbulent action disturbing the spiral motion of the gas as well as retarding its velocity, and also cause an undue mixing of the fresh and burned gases.

While I claim specific advantages, as pointed out, are obtained by feathering the radial end of the port opening, said ports may be made rectangular in section as is customary in gas engine practice and operative results obtained.

Fig. 9 illustrates a modification of Figs. 7 and 8, showing a single intake port. In this modification the annular channel 30 is carried around the combustion chamber and terminates at the radial end of the port opening $30^r$. Said annular channel may be the width of the port as shown in Fig. 7, or it may be widened to the depth of the usual counterbore chamber at the top of the cylinder.

In the foregoing description the scavenging fluid is referred to as the incoming gas charge. Since it is common practice in certain types of internal combustion engines to scavenge with air, and, in other types, to admit the fuel direct into the cylinder and there mix with the air, I desire to point out that my invention may also be employed advantageously in such types. The scavenging air, entering the cylinder and performing the function of the piston in ejecting the burned gases, must do this work in a short space of time and at various engine speeds, results which can best be obtained by definitely controlling the air through the agency of fluid motion, as above described, and thereby producing partically a homogeneous air piston which will drive the burned gases out with the minimum cost of air pressure. It is obvious that the cyclonic currents within the combustion chamber and the cylinder would facilitate rapid distribution of a fuel charge and that liquid or dust fuel, injected centrally into the combustion chamber, would, through the action of gravity, be thrown outward and mixed with the air.

Again, in engines where the combustion charge is admitted in the form of a gas, a preliminary scavenging charge of air is sometimes used for the purpose of cooling the interior of the cylinder and clearing out the burned gas more thoroughly, and the peculiarities of my invention are well fitted for this purpose since the burned gas, the air and the fresh gas, respectively, may be segregated and practically controlled as homogeneous bodies of fluid.

In the application of my invention to four-cycle engines advantages are attained through the segregation of the fresh and the burned gases in the cylinder, it being understood that mixing of the two gases fouls the explosive charge.

Usually in four-cycle engines the interior formation of the combustion chamber and the intakes are not designed with the view of controlling and separating the gases, and the result is turbulent, irregular currents which partly mix and stratify the gases in a manner to produce poor combustion and, in the case of an engine running on light charges and a weak ignition, a cylinder may misfire entirely.

Engines used for racing, aeroplanes and other high duty work frequently cause trouble through overheating of the piston head, the piston being a part in high speed engines that can not be conveniently water-cooled: as a result, the crank chamber and bearings become overheated, the piston crown accumulates heat in the center faster than it can be radiated and premature ignition is started, and, in high compression engines, pistons burn through.

By so concentrating the dead gas in the cylinder next to the piston the overheating of the piston may be minimized and a higher compression engine produced.

The application of this invention to four-cycle engines would be substantially the same in detail as the two-cycle system, and as shown in the above described drawings.

It is obvious that various changes and modifications may be made to the details of construction without departing from the general spirit of the invention.

I claim:—

1. In an internal combustion engine, the combination with a cylinder, having a piston working therein, there being a fluid intake and a fluid outlet to said cylinder, and a concavo-convex deflector forming a continuation of said intake and having a central diminished terminal.

2. In an internal combustion engine, the combination with a cylinder, having a piston working therein, there being a fluid intake and a fluid outlet to said cylinder, the intake being tangentially disposed, and a concavo-convex deflector registering with said intake, the fluid from said intake being directed by said deflector to form a whirling core.

3. In an internal combustion engine, the combination with a cylinder, having a piston working therein, there being a fluid intake and a fluid outlet to said cylinder, the intake comprising opposed tangential intake ports, and a concavo-convex deflector registering with said ports, the fluid from said ports being directed by said deflector to form a whirling core.

4. In an internal combustion engine, the combination with a cylinder, having a piston working therein, there being a fluid intake and a fluid outlet to said cylinder, the intake comprising a tangential annular port, and a deflector registering with said port and having a diminished central terminal to direct the fluid in a solid whirling core.

5. In an internal combustion engine, the combination with a cylinder, having a piston working therein, there being a fluid intake and a fluid outlet to said cylinder, the intake comprising opposed tangential intake ports, and a concavo-convex deflector registering with said ports, the fluid from said ports being directed by the deflector to form a whirling core.

6. In an internal combustion engine, the combination with a cylinder, having a piston working therein, there being a fluid intake and a fluid outlet to said cylinder, a deflector and a co-acting stepped spiral surface registering with said intake, the fluid from the intake being directed by the deflector and the stepped spiral surface to form a homogeneous whirling core.

7. In an internal combustion engine, the combination with a cylinder, having a piston working therein, there being a fluid intake and a fluid outlet to said cylinder, there being a tangential port connected with said intake, a concavo-convex deflector and a coacting stepped spiral surface registering with said port, the fluid from the intake port being directed by the deflector and stepped spiral surface to form a homogeneous whirling core.

8. In an internal combustion engine, the combination with a cylinder, having a piston working therein, there being a fluid intake and a fluid outlet to said cylinder, there being a tangential annular port connected with said intake, a concavo-convex deflector and a co-acting stepped spiral surface registering with said port, the fluid from the intake port being directed by the deflector and stepped spiral surface to form a homogeneous whirling core.

9. In an internal combustion engine, the combination with a cylinder, having a piston working therein, there being a fluid intake and a fluid outlet to said cylinder, there being opposed tangential annular ports connected with said intake, a concavo-convex deflector and a co-acting stepped spiral surface registering with said ports, the fluid from the intake ports being directed by the deflector and stepped spiral surface to form a homogeneous whirling core.

10. In an internal combustion engine, the combination with a cylinder, having a piston working therein, there being a fluid intake and a fluid outlet to said cylinder, there being a tangential port connected with said intake, a concavo-convex deflector registering with said port, and spiral-forming means co-acting with said deflector, the fluid from the intake port being directed by the deflector and spiral-forming means to form a homogeneous whirling core.

11. In an internal combustion engine, the combination with a cylinder, having a piston working therein, there being a fluid intake and a fluid outlet to said cylinder, there being a tangential annular port connected with said intake, a concavo-convex deflector registering with said port, and spiral-forming means co-acting with said deflector, the fluid from the intake port being directed by the deflector and spiral-forming means to form a homogeneous whirling core.

12. In an internal combustion engine, the combination with a cylinder, having a piston working therein, there being a fluid intake and a fluid outlet to said cylinder, there being opposed tangential annular ports connected with said intake, a concavo-convex deflector registering with said ports, and spiral-forming means co-acting with said deflector, the fluid from the intake ports being directed by the deflector and spiral-forming means to form a homogeneous whirling core.

13. In an internal combustion engine, the combination with a cylinder, of a piston operating therein, there being a fuel intake and a fuel outlet to said cylinder, there being a spiral formation adjacent to said intake to receive the gas from said intake, and a sharp cornered step formation forming the termination of said spiral formation adjacent to said intake, the sharp cornered step formation permitting the ready release of the gas after having encircled said cylinder to clear the subsequently incoming gas.

14. In an internal combustion engine, the combination with a cylinder, of a piston operating therein, there being a fuel intake and a fuel outlet to said cylinder, a cylinder head adjacent to said intake, a spiral formation interiorly of said head to receive the gas from said intake, and a deflector forming the central continuation of said spiral formation and having a diminished central terminal to co-operate with the gas coming from said intake to produce a homogeneous fluid piston.

15. In an internal combustion engine, the combination with a cylinder, of a piston operating therein, there being a fluid intake and a fluid outlet to said cylinder, annular inlet means connected with said intake, and spiral forming means registering with the said inlet means to receive the gas therefrom, a diminished central terminal on said spiral forming means, the annular inlet means coacting with the spiral forming means and said diminished central terminal to form a homogeneous whirling core.

WILLIAM H. FAUBER.

Witnesses:
GUSTAV DREWS,
H. D. PENNEY.